April 21, 1942.    R. L. KENNGOTT    2,280,492
APPARATUS FOR TESTING TRANSMISSION SYSTEMS
Filed April 23, 1940    4 Sheets-Sheet 1

INVENTOR
Robert L. Kenngott
ATTORNEY.

April 21, 1942. R. L. KENNGOTT 2,280,492
APPARATUS FOR TESTING TRANSMISSION SYSTEMS
Filed April 23, 1940 4 Sheets-Sheet 2
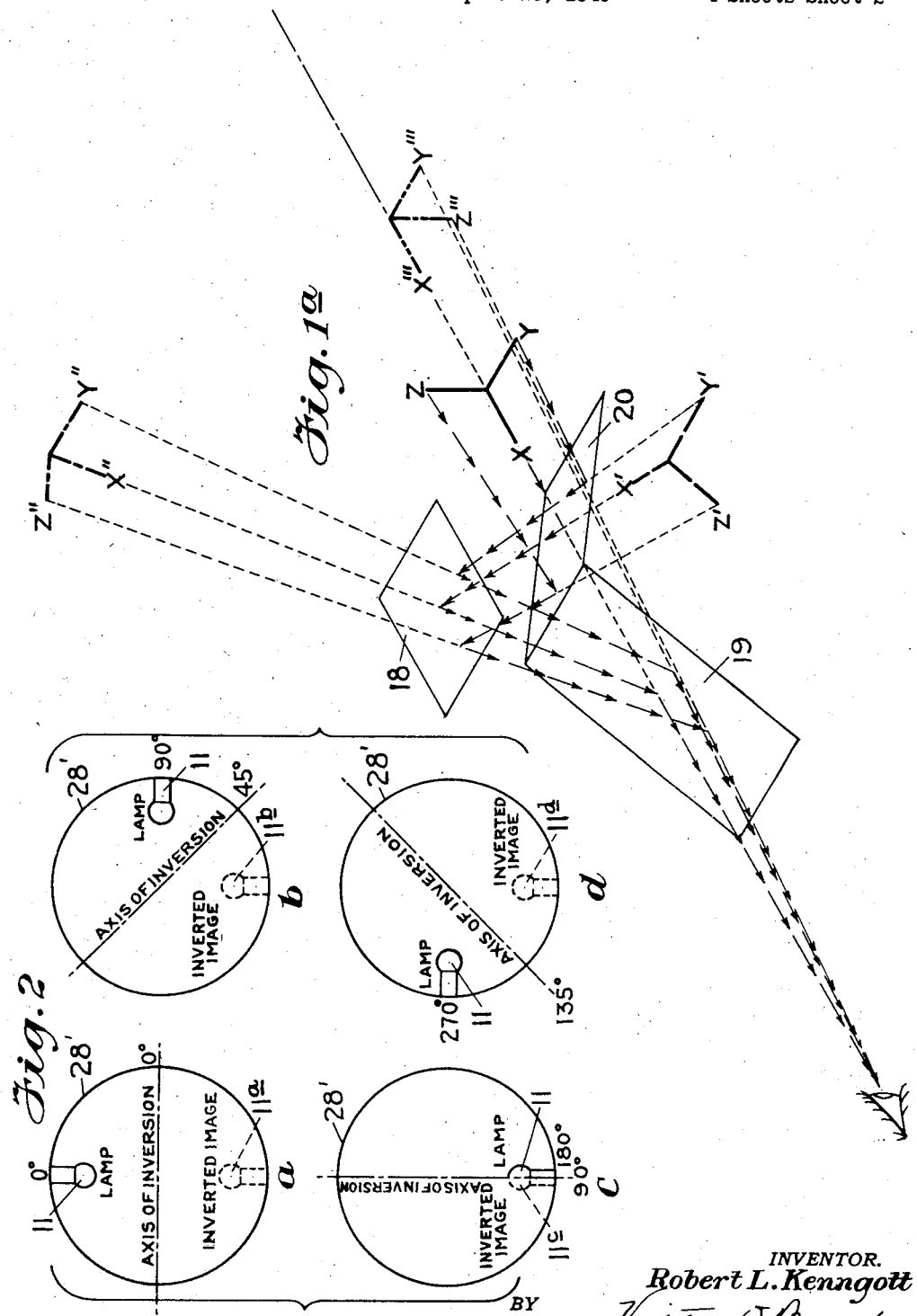
INVENTOR.
Robert L. Kenngott
BY
ATTORNEY.

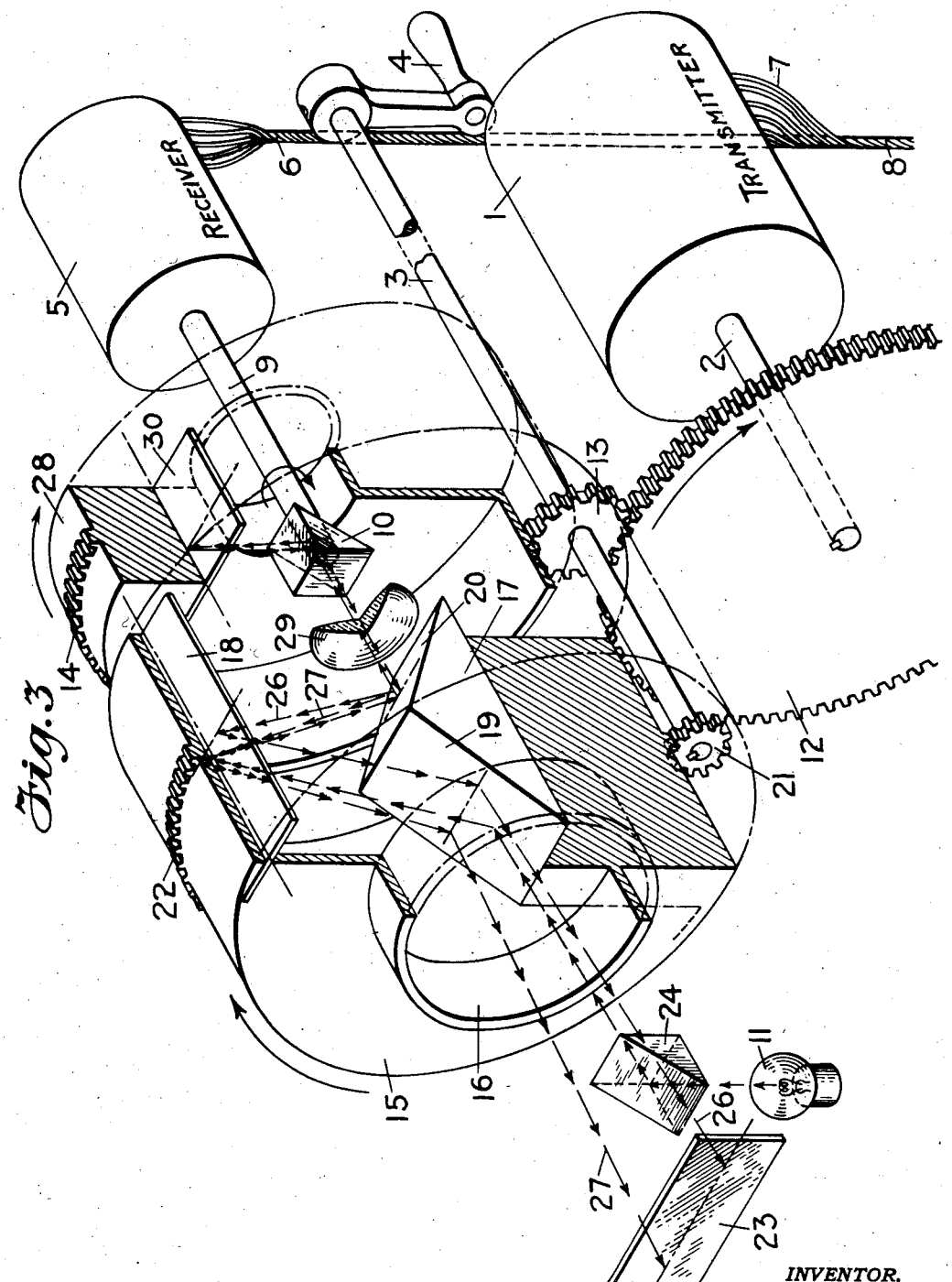

April 21, 1942.　　　R. L. KENNGOTT　　　2,280,492
APPARATUS FOR TESTING TRANSMISSION SYSTEMS
Filed April 23, 1940　　　4 Sheets-Sheet 4
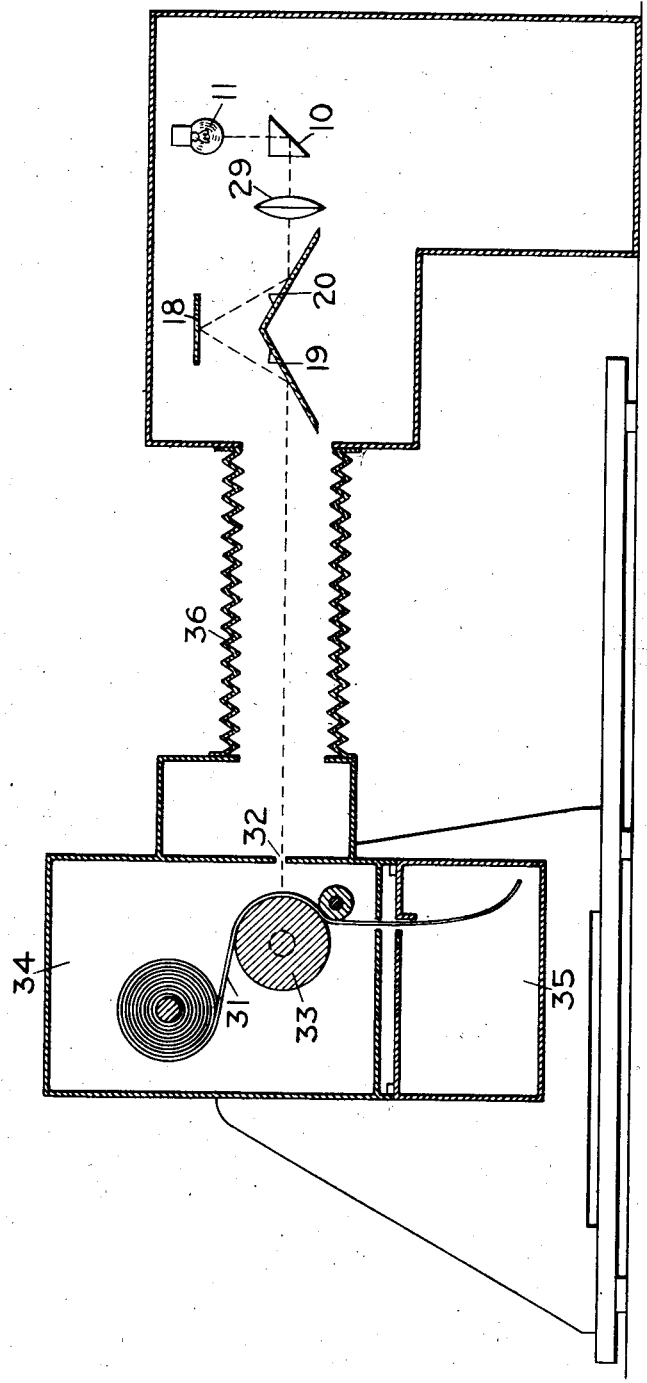
INVENTOR.
Robert L. Kenngott
BY
ATTORNEY.

Patented Apr. 21, 1942

2,280,492

UNITED STATES PATENT OFFICE 2,280,492

APPARATUS FOR TESTING TRANSMISSION SYSTEMS

Robert L. Kenngott, New York, N. Y., assignor to Ford Instrument Company, Inc., Long Island City, N. Y., a corporation of New York Application April 23, 1940, Serial No. 331,124

4 Claims. (Cl. 88—14)

This invention relates to apparatus for testing a synchronous transmitter and receiver system.

In a great many fields of mechanics, it often occurs that a movement of rotation of one part of a mechanism is desired to be reproduced at a distant point. Recourse has been had to transmitter and receiver rotors kept in synchronism by the use of electric currents controlled by the transmitter rotor and turned into mechanical rotational movements by the receiver.

It has been appreciated in this art that there may be at times a lag or lead between the position of the transmitter and that of the receiver, the amount of which it is desired to be known when designing such mechanisms, that such errors may be taken into consideration in connection with the accuracy demanded of the mechanism as a whole. Also it has been desired to be known with what fidelity the rotation given to the transmitter is reproduced by the receiver.

The principal object of this invention is to provide a method of and an apparatus for testing the accuracy of motion of synchronous transmission systems.

Another object of the invention is to provide an apparatus for determining the lag or lead between a synchronous transmitter and its associated receiver under operating conditions.

A still further object is to provide an apparatus for testing the accuracy of synchronous transmission systems by which the errors in the system may be observed visually and continuously.

A still further object of the invention is to provide apparatus for testing the accuracy of synchronous transmission systems by which the errors may be observed as a deflection from a reference point on a ground glass of a small spot of light.

A still further object is to provide an apparatus for testing the accuracy of synchronous transmission systems by which the errors in the system may be recorded photographically as a function of time in the manner of the trace of an oscillogram.

Other objects of the invention will be apparent from the specification and the drawings.

Fig. 1a is a diagram showing the manner in which three reflecting surfaces are employed to invert the field of view as observed through the center portions of the drums;

Fig. 2 is a series of views through the center portions of the drums to the source of light showing the relation between the successive positions of the lamp with reference to the axis of inversion, these views are designated as a, b, c and d respectively;

Fig. 3 shows an alternative arrangement of the apparatus of Fig. 1 in which the lamp is secured to a fixed external mount and is replaced by a reflecting surface in the drum;

Fig. 4 shows an alternative arrangement of the apparatus in which a photographic recording mechanism replaces the ground-glass screen of Fig. 1 and Fig. 3.

Figure 1:
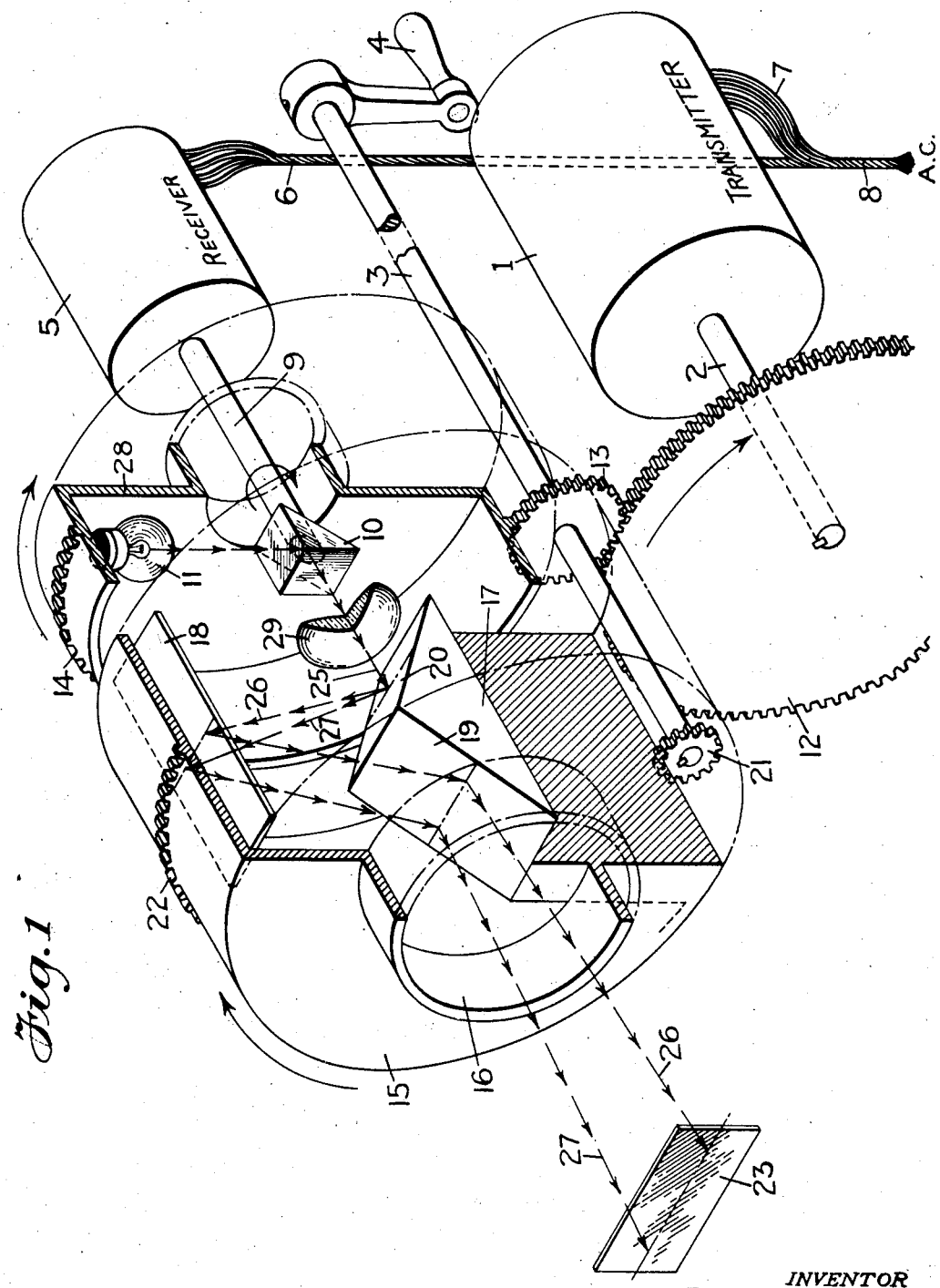
Fig. 1 is a perspective view of an embodiment of the testing apparatus partly in section, but showing the outlines of the cut-away portions in dot and dash lines.

The optical principle upon which the present embodiment of the invention is based is that when a reflecting surface forms an optical image the sense of the mirror-image is inverted with respect to the sense of its object and such inversion takes place about the mirror plane as boundary. An extension of this principle provides that when rays of light are reflected an odd number of times such inversion of sense occurs in the resultant image.

Advantage is also taken of the optical principle that when a reflecting surface is rotated on an axis passing through the reflecting surface and at an angle thereto, the projections of the reflected rays on a plane perpendicular to the axis of rotation move through twice the angle of rotation of the reflecting surface.

In the drawings, 1 represents a transmitter the shaft of which 2 receives motion from some external source such as shaft 3 rotated by handle 4, gear 13 and gear 12 secured to shaft 2. 5 represents a receiver connected by conductors 6, 7 and 8 to transmitter 1 and to a source of power.

On the shaft 9 of receiver 5 is mounted a reflecting surface 10, shown in the drawings as a prism. Mounted coaxially with shaft 9 is a hollow drum 28 on the inside walls of which is mounted a source of light 11 constituting a reference luminous area. Drum 28 receives its motion from gear 12 mounted on shaft 2 through gears 13 and 14. Drum 28 rotates at the same speed as shaft 2.

Also mounted coaxially with shaft 9 is a second drum 15 which rotates in ball bearings (not shown) on races 16, the inner diameters of which are sufficiently large to permit the passage of light therethrough. Drum 29 is mounted in a similar manner.

Mounted on the center axis of drum 15 is a two-faced reflector 17 and mounted on the inside walls of drum 15 is a plane reflector 18 whose plane is parallel to the axis of rotation and parallel to the line of intersection of plane reflecting surfaces 19 and 20 of reflector 17. Reflector 18 is placed at a distance of A tan 2a from the axis of rotation, where a is the angle between the axis of rotation and surfaces 19 and 20 and A is half the distance between the points of intersection of the surfaces with the axis of rotation. The three surfaces 18, 19 and 20 are placed symmetrically with respect to the axis of rotation.

Drum 15 is rotated by shaft 2 through the gears 12, 13, 21 and 22 at half the speed of shaft 2.

Between the reflector 17 and the reflector 10 is placed a condensing lens 29 by which the source of light 11 is focused such that when reflected by surfaces 20, 18 and 19 the rays will appear as a tiny spot on ground-glass plate 23 mounted so that its central normal is in the axis of shaft 9 extended.

With reference to Fig. 2, and particularly to view a, circle 28' represents the limits of the field of vision made by the inner edges of the ball bearing assembly rotating in race 16, when looking along the axis of shaft 9 extended, as shown in Fig. 1, with the lens 29 removed. In this position the axis of inversion is horizontal, as indicated, and the source of light 11 appears as an inverted image at 11a.

View b is similar to view a of Fig. 2, but with drum 15 rotated ninety degrees and the image rotator drum 15 rotated forty-five degrees. The axis of inversion has been rotated forty-five degrees but as the inverted image appears on the opposite side of the axis of inversion and in a line perpendicular thereto, the inverted image appears at 11b at the bottom of the field as before. Similarly, as shown in views c and d, for rotation of drum 28 through one hundred eighty degrees and two hundred seventy degrees respectively, and the drum 15 rotated ninety degrees and one hundred thirty-five degrees, respectively, the inverted image remains at the bottom of the field. It therefore follows that the triple-reflection image-rotator acts to maintain the oscillating spot of light in a horizontal line on the ground-glass plate 23.

In assembling the apparatus, and before each test, drums 28 and 15 and the reflector are lined up such that a ray of light from source 11 is reflected by prism 10, through lens 29, after which it undergoes a triple reflection by the image rotator surfaces 20, 18 and 19 and strikes ground-glass plate 23.

In operation, a motion is given to shaft 3 which is transmitted to shaft 2. The rotation of transmitter 1 causes receiver shaft 9 to rotate and with it the reflecting surface 10. Drum 28 is also rotated mechanically the same amount as shaft 2 and drum 15 has been rotated mechanically half the amount of shaft 2.

In Fig. 1a, the three reflecting surfaces 18, 19, and 20 are employed to view a right-handed system of coordinate axes, X—Y—Z, along the direction corresponding to the axis of rotation of the drums 15 and 28. In this view the X—Y plane is parallel to reflector 18. The successive images of the co-ordinate axes are indicated as X'—Y'—Z', X''—Y''—Z'', and X'''—Y'''—Z''' after the first, second and third reflections respectively. The image X'''—Y'''—Z''' is a left-handed co-ordinate system formed by inversion of the Z axis. Inversion takes place about the X—Y plane which is viewed on edge when looking along the axis of rotation and appears as an axis about which the field of view is inverted.

If, for any reason, the shaft 9 does not rotate exactly with shaft 2 and the same amount as shaft 2 the ray 25 from source 11 will take the path 26 or 27 according to whether shaft 9 lags behind or leads shaft 2. The amount of movement of the spot of light on plate 23 is a measure of the reproduction of the motion of shaft 2 by shaft 9. If the spot of light remains steady on plate 23, then it is known that the transmitter 1 and the receiver 5 have remained in synchronous relation to each other.

With reference to Fig. 3, the mechanism is identical with that shown in Fig. 1 with the exception of the position of the source of light for the reference luminous area and the optical system associated with drum 28. In Fig. 3 the lamp 11 is shown as mounted externally in a fixed position as indicated. A reflecting surface shown as a prism 24 is mounted above the lamp 11 but just below the center line of shaft 9 extended. A plane reflector 30 is mounted on the inside walls of drum 28 with its surface parallel to the axis of rotation and substantially parallel to the upper face of prism 10.

With this alternative arrangement of the apparatus a ray of light from source 11 is reflected by prism 24, undergoes a triple reflection by the image rotator surfaces 19, 18 and 20, passes through lens 29, is reflected by prism 10 and reflector 30 creating a reference luminous area, and thereafter returns through the optical system via 10, 29, 20, 18, and 19 to focus on ground-glass plate 23.

In all other respects the modified apparatus in Fig. 3 is identical with that in Fig. 1 and the description of the operation of the latter applies equally to the former.

Fig. 4 is an embodiment of the invention which provides a means of photographic recording in place of visual observation of a spot of light on the ground-glass plate. It consists of a photosensitive film or paper 31 which is carried past a horizontal slit aperture 32 by the driving drum 33 from the magazine 34 to the receiving box 35. Any conventional means are provided for driving the drum 33. The beam of light from the image rotator assembly 11, 10, 29, 20, 18, and 19 passes through a light-tight bellows 36 to focus as a tiny spot on the film behind aperture 32. The combination of horizontal motion of the spot of light together with passage of the film 31 around drum 33 produces a photographic record on the film in the manner of an oscillogram trace.

In each of the various embodiments of the invention, means are provided for varying the inches deflection of the spot of light on ground-glass plate 23 or film 31 per degree of error between receiver 5 and transmitter 1 by adjustment in the positions of the source of light 11, lens 29, and ground-glass plate 23 or film 31, either separately or simultaneously.

It is obvious that various changes may be made by those skilled in the art in the embodiments of the invention illustrated in the drawings and described above within the principle and scope of the invention as expressed in the appended claims.

I claim:

1. In combination, a synchronous transmitter and receiver including power and interconnecting leads, a light reflecting surface mounted on the shaft of said receiver at an angle of forty-five degrees thereto, a drum mounted to rotate coaxially with but independent of the said shaft of said receiver, a reference luminous area on the inside walls of said drum and in the plane transverse to the shaft and including the center of said reflecting surface, a second drum mounted to rotate parallel to and coaxially with said first drum, the two said drums being adapted to permit light to pass through their ends at their axes, a reflecting prism with two flat reflecting surfaces at an angle to each other and the centers of said surfaces being in the axis of rotation of said drums, a condensing lens between said reflecting surface and said two-faced reflector prism, a second flat reflecting surface mounted on the inside walls of said second drum the longitudinal center line of which is parallel to the axis of rotation of said drums and whose transverse center line is parallel to the line of intersection of the two surfaces of said prism, means to rotate said first drum and said transmitter at the same speed, means to rotate said second drum at half the speed of said first drum, and a ground glass plate the central normal of which is in alignment with the axis of the said drums, whereby rays of light from the reference luminous area will be reflected by the reflecting surface and the surfaces of the prism and the flat surface to the center of the ground glass when the shaft and the drums are rotationally in alignment and whereby the said rays will be displaced laterally from the center of the ground glass when the shaft and drums are not in rotational alignment.

2. In combination, a synchronous transmitter and receiver including power and interconnecting leads, a light reflecting surface mounted on the shaft of said receiver at an angle of forty-five degrees thereto, a drum mounted to rotate coaxially with but independent of the said shaft of said receiver, a source of light mounted on the inside walls of said drum and adapted to rotate with the drum in a plane including the center of said reflecting surface, a second drum mounted to rotate parallel to and coaxially with said first drum, the two said drums being adapted to permit light to pass through their ends at their axes, a reflecting prism with two flat reflecting surfaces at an angle to each other and the centers of said surfaces being in the axis of rotation of said drums, a condensing lens between said reflecting surface and said two-faced reflector prism, a second flat reflecting surface mounted on the inside walls of said second drum the longitudinal center line of which is parallel to the axis of rotation of said drums and whose transverse center line is parallel to the line of intersection of the two surfaces of said prism, a ground-glass plate the central normal of which is in alignment with the axis of said prism, means to rotate said first drum and said transmitter at the same speed, and means to rotate said second drum at half the speed of said first drum.

3. In combination, a synchronous transmitter and receiver including power and interconnecting leads, a light reflecting surface mounted on the shaft of said receiver at an angle of forty-five degrees thereto, a drum mounted to rotate coaxially with but independent of the said shaft of said receiver, a second drum mounted to rotate parallel to and coaxially with said first drum, the two said drums being adapted to permit light to pass through their ends at their axes, a reflecting prism with two flat reflecting surfaces at an angle to each other and the centers of said surfaces being in the axis of rotation of said drums, a condensing lens between said reflecting surface and said two-faced reflector prism, a second flat reflecting surface mounted on the inside walls of said second drum the longitudinal center line of which is parallel to the axis of rotation of said drums and whose transverse center line is parallel to the line of intersection of the two surfaces of said prism, a ground-glass plate the central normal of which is in alignment with the axis of said prism, a source of light exterior to said drums adapted to be reflected by said surfaces to the inside walls of said first drum, a reflecting surface mounted on the inside walls of said first drum adapted to reflect an image of said light to the center of the first said reflecting surface in a direction perpendicular to the said shaft, means to rotate said first drum and said transmitter at the same speed, and means to rotate said second drum at half the speed of said first drum.

4. In combination, a synchronous transmitter and receiver including power and interconnecting leads, a light reflecting surface mounted on the shaft of said receiver at an angle of forty-five degrees thereto, a drum mounted to rotate coaxially with but independent of the said shaft of said receiver, a source of light on the inside walls of said drum and adapted to rotate with the drum in a plane including the center of said reflecting surface, a second drum mounted to rotate parallel to and coaxially with said first drum, the two said drums being adapted to permit light to pass through their ends at their axes, a reflecting prism with two flat reflecting surfaces at an angle to each other and the centers of said surfaces being in the axis of rotation of said drums, a condensing lens between said reflecting surface and said two-faced reflector prism, a second flat reflecting surface mounted on the inside walls of said second drum the longitudinal center line of which is parallel to the axis of rotation of said drums and whose transverse center line is parallel to the line of intersection of the two surfaces of said prism, the said second reflecting surface being mounted from the axis of rotation of the drums a distance equal to half the distance between the points of intersection of the axis of rotation and the faces of the prism multiplied by the tangent of twice the angle between the faces of the prism and the axis of rotation of the drum, a ground-glass plate the central normal of which is in alignment with the axis of said prism, means to rotate said first drum and said transmitter at the same speed, and means to rotate said second drum at half the speed of said first drum.

ROBERT L. KENNGOTT.